(12) United States Patent
Sawachi

(10) Patent No.: US 7,486,330 B2
(45) Date of Patent: Feb. 3, 2009

(54) PICKUP DEVICE FOR PICKING UP IMAGE

(75) Inventor: Youichi Sawachi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 858 days.

(21) Appl. No.: 10/819,999

(22) Filed: Apr. 8, 2004

(65) Prior Publication Data

US 2004/0201770 A1 Oct. 14, 2004

(30) Foreign Application Priority Data

Apr. 9, 2003 (JP) .................. 2003-105526

(51) Int. Cl.
*H04N 5/232* (2006.01)
(52) U.S. Cl. ................................................ 348/345
(58) Field of Classification Search ................. 348/345
See application file for complete search history.

(56) References Cited

U.S. PATENT DOCUMENTS

| | | | | |
|---|---|---|---|---|
| 4,495,491 A | * | 1/1985 | Postl | 345/157 |
| 4,542,984 A | * | 9/1985 | Shiota et al. | 355/68 |
| 5,448,295 A | * | 9/1995 | Hirota | 348/345 |
| 5,949,586 A | * | 9/1999 | Hirasawa et al. | 359/698 |
| 6,067,114 A | * | 5/2000 | Omata et al. | 348/345 |
| 6,271,883 B1 | * | 8/2001 | Iijima et al. | 348/345 |
| 6,359,650 B1 | * | 3/2002 | Murakami | 348/333.04 |

FOREIGN PATENT DOCUMENTS

| | | |
|---|---|---|
| JP | 7-311330 A | 11/1995 |
| JP | 9-325397 A | 12/1997 |
| JP | 2000-125178 A | 4/2000 |
| JP | 2002-156672 A | 5/2002 |

* cited by examiner

*Primary Examiner*—James M Hannett
(74) *Attorney, Agent, or Firm*—Sughrue Mion, PLLC

(57) ABSTRACT

A digital still camera includes a pickup lens, which focuses object light on a focal plane. An externally operable focus adjusting ring adjusts focusing of the pickup lens. A CCD image sensor is disposed on the focal plane, for receiving the object light to produce image data. A liquid crystal display (LCD) panel displays an image according to the image data. An EEPROM stores information of an area split pattern having 36 partial areas in which the LCD panel is split. A CPU displays a focus adjusting state of the 36 partial areas distinctly during adjustment of the focus adjusting ring. CPU compares a focus evaluation value fna with a preceding evaluation value fnb, and extracts at least one of the 36 partial areas where the focus adjusting state is in-focus according to a result of comparison.

16 Claims, 10 Drawing Sheets

FIG. 4A
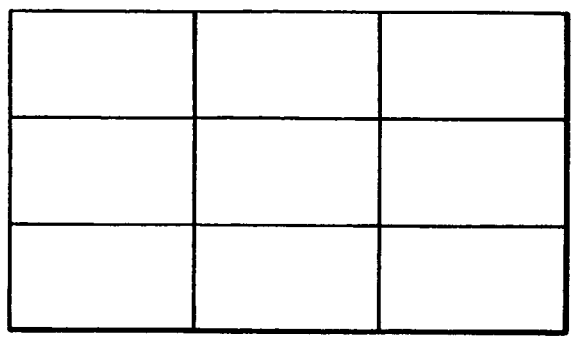
PATTERN B
FIG. 4B
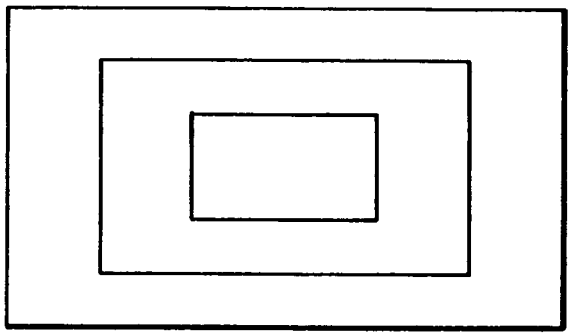
PATTERN C
FIG. 4C
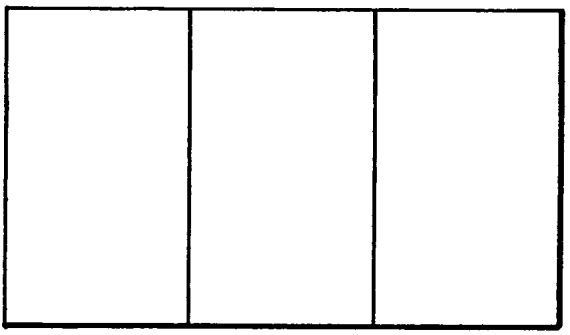
PATTERN D
FIG. 5
| MODE | MF AUXILIARY SETTING | | | | |
|---|---|---|---|---|---|
| STATUS | ON | | | | OFF |
| SPLIT PATTERN | A | B | C | D | |

PICKUP DEVICE FOR PICKING UP IMAGE

BACKGROUND OF THE INVENTION

1. Field of the Invention

The present invention relates to a pickup device for picking up an image. More particularly, the present invention relates to a pickup device for picking up an image, in which manual operation of focusing a pickup lens to photograph an image can be effected easily and with high precision.

2. Description Related to the Prior Art

A digital still camera is widely used, and includes a CCD image area sensor or other pickup elements for picking up an object image. Object light is converted into digital image data, which is written to an internal memory, memory card or other recording media. Some types of digital still cameras are manual focusing types, which has a focus adjusting ring for being rotationally shifted for adjusting a focus of a pickup lens.

There are various suggestions of manual focus constructions for the digital still camera. JP-A 7-311330 discloses a camera in which a position of an eye point of a user is detected. There are plural preset detection ranges, one of which is selected for the pickup lens according to the detected eye point. A focus adjusting state for the selected detection range is indicated in a viewfinder as an in-focus indicia. Furthermore, JP-A 9-325397 discloses a camera having a monitor display panel, and in which a numerical expression for the focus adjusting state is displayed on the display panel upon rotating the focus adjusting ring.

Also, JP-A 2000-125178 suggests the use of the display panel which is driven after the pickup, and entirely displays an image of an object near to the rangefinding point for the focusing. JP-A 2002-156672 discloses a digital still camera having a circuit for outputting a distance signal of a photographic object according to a position of the focus adjusting ring. A rangefinder measures object distances of plural objects in a region to be picked up. Among the objects, a certain one is selected by considering coincidence of the distance signal and the object distance. The selected object is displayed on the display panel at a desired magnification.

However, any of the digital still cameras disclosed in the above documents has shortcomings in that a position of an in-focus state cannot be exactly detected typically if plural objects of various distances exist in a single scene. A problem specially arises in a portrait mode to photograph a facial image of a person. The aperture stop of the pickup lens is set fully open. Adjustment of the focus is extremely difficult according to the intention of a user due to the fully open aperture stop.

SUMMARY OF THE INVENTION

In view of the foregoing problems, an object of the present invention is to provide a pickup device for picking up an image, in which manual operation of focusing a pickup lens to photograph an image can be effected easily and with high precision.

In order to achieve the above and other objects and advantages of this invention, a pickup device includes a pickup lens for focusing object light on a focal plane. An externally operable focus adjuster adjusts focusing of the pickup lens. An image sensor is disposed on the focal plane, for receiving the object light to produce image data. An image display panel displays an image according to the image data. A split pattern memory stores information of an area split pattern having plural partial areas in which the image display panel is split.

A controller displays a focus adjusting state of the plural areas distinctly during adjustment of the focus adjuster.

Furthermore, a focus evaluator obtains a first focus evaluation value according to the image data to represent the focus adjusting state of respectively the plural areas, and obtains a present focus evaluation value according to the image data upon lapse of a predetermined time, the first focus evaluation value becoming a preceding evaluation value prior to the focus evaluation value. An evaluation value memory stores the preceding evaluation value. The controller compares the focus evaluation value with the preceding evaluation value, and extracts at least one of the plural areas where the focus adjusting state is in-focus according to a result of comparison.

The controller causes the image display panel to indicate an area pointing pattern for designating the at least one partial area being in-focus.

The focus evaluator includes an image data splitting unit for splitting the image data between the plural areas. A contour extracting processing unit, for processing of contour extraction according to the image data, outputs a contour signal of respectively the plural areas. A signal integrating unit, for processing of integration according to the image data, outputs an image signal of respectively the plural areas. The controller obtains the focus evaluation value according to the contour signal and the image signal.

If the focus evaluation value is higher than the preceding evaluation value, the controller determines that the focus adjusting state of respectively the areas has become sharper.

The plural areas include at least one middle area and one peripheral area disposed beside the middle area.

The area pointing pattern has a frame form or has a form with a specific brightness or color, and renders the at least one partial area visually distinct from remaining ones of the plural areas.

The controller further compares the focus evaluation value with a threshold value, and if the focus evaluation value is higher than the preceding evaluation value and equal to or higher than the threshold value, determines that the focus adjusting state of respectively the areas has become sharper.

The controller considers a prior preceding evaluation value of the focus adjusting state prior to the preceding evaluation value, compares the focus evaluation value with the preceding evaluation value and the prior preceding evaluation value, and extracts the at least one partial area being in-focus.

Furthermore, a shifting direction detector detects a shifting direction of the focus adjuster. The controller considers an output from the shifting direction detector to check a shift of the focus adjuster in one direction, obtains the focus evaluation value, the preceding evaluation value and the prior preceding evaluation value from the focus evaluator during the shift of the focus adjuster, and determines that the focus adjusting state is in-focus if the preceding evaluation value is higher than the focus evaluation value and than the prior preceding evaluation value.

Furthermore, an input unit is responsive to external operation, for writing the present focus evaluation value to the evaluation value memory by overwriting of the preceding evaluation value in the evaluation value memory.

Furthermore, an externally operable switch is settable in first and second set positions according to external operation, for turning on indication of the area split pattern when in the first set position, and for turning off the indication of the area split pattern when in the second set position.

The externally operable switch has a depressible portion of a seesaw type for shifting upon being depressed.

The split pattern memory stores plural area split patterns between which arrangement of the plural areas is different.

Furthermore, a pattern selector designates a selected one of the plural area split patterns to read information thereof from the split pattern memory, the controller causing the image display panel to display the selected area split pattern.

The plural areas in the area split pattern are arranged in a matrix form.

The peripheral region in the area split pattern is disposed about the middle region.

In a preferred embodiment of the invention, a focus evaluation value determiner includes an image data splitting unit for splitting the image signal between the areas. A contour signal integrating unit subjects the image signal to contour extracting processing for respectively the areas to obtain a contour signal, and integrates the contour signal to obtain a first integration signal for respectively the areas. An image signal integrating unit integrates the image signal according to splitting between the areas, to obtain a second integration signal for respectively the areas. A determining unit determines the focus evaluation value according to the first and second integration signals.

Furthermore, a shift/direction detector detects a shifting direction and a shifting amount of the manual focus adjuster, wherein the evaluation value memory is cleared upon a change of the shifting direction of the manual focus adjuster, and the focus evaluator checks the focus adjusting state of respectively the areas upon shifting of the manual focus adjuster by a predetermined shifting amount.

Furthermore, a mode switch turns on a manual focus aid setting for an auxiliary use, wherein when the aid setting is turned on, the areas are kept displayed on the image display panel while the externally operable unit is operated.

BRIEF DESCRIPTION OF THE DRAWINGS

The above objects and advantages of the present invention will become more apparent from the following detailed description when read in connection with the accompanying drawings, in which:

FIG. 4A is a plan illustrating another preferred area split pattern;

FIG. 4B is a plan illustrating one preferred area split pattern with partial areas disposed from the middle to the periphery;

FIG. 4C is a plan illustrating one preferred area split pattern with partial areas arranged in one dimension;

FIG. 5 is a table illustrating a relationship between modes and patterns;

DETAILED DESCRIPTION OF THE PREFERRED EMBODIMENT(S) OF THE PRESENT INVENTION

Figure 1:
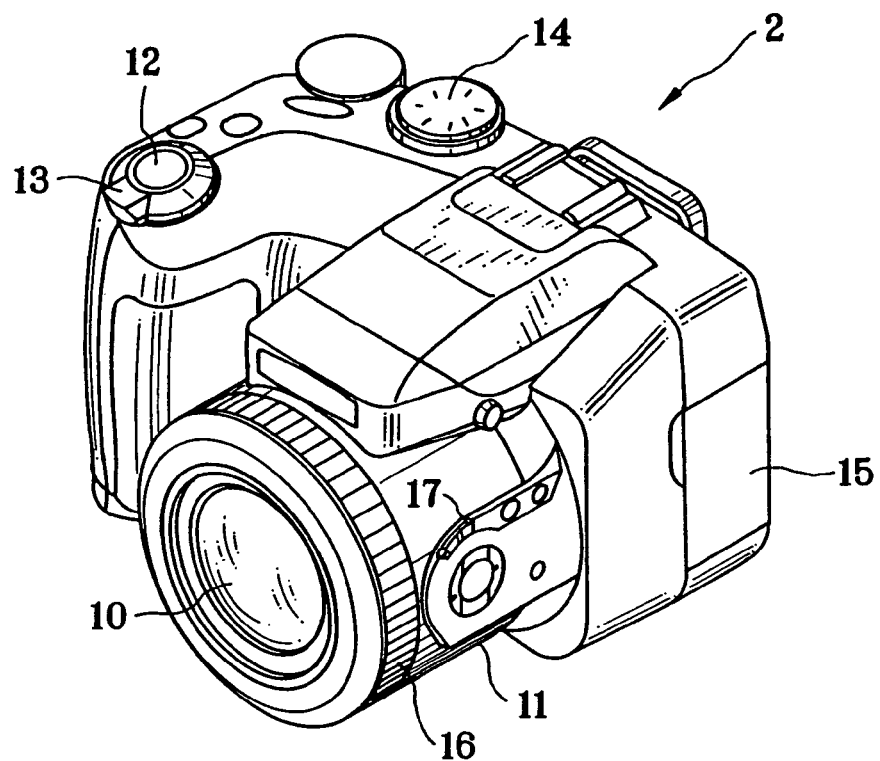
FIG. 1 is a perspective illustrating a digital still camera.
Figure 2:
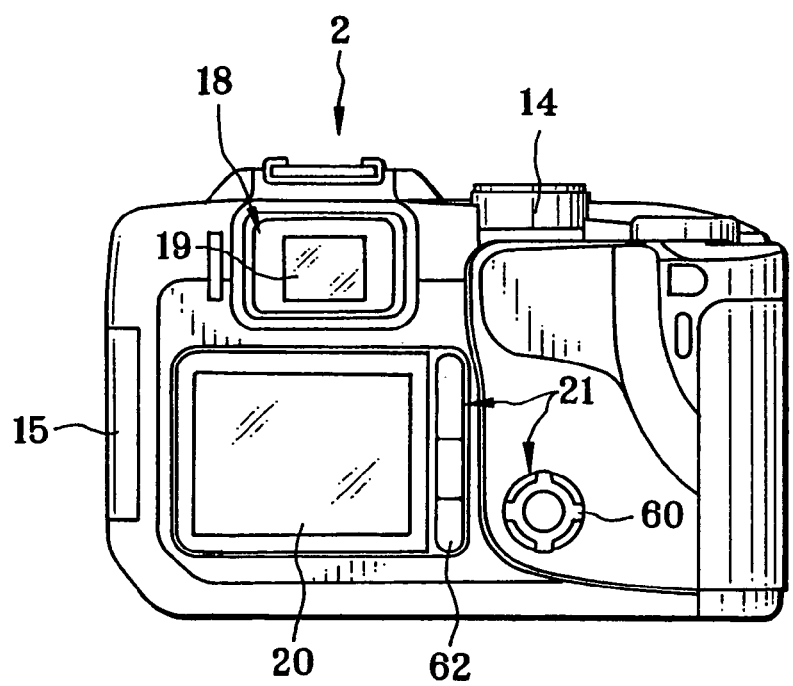
FIG. 2 is a rear elevation illustrating the digital still camera.

In FIGS. 1 and 2, a digital still camera 2 as pickup device is provided with a lens barrel 11. A pickup lens 10 is mounted in the lens barrel 11. An upper face of the digital still camera 2 is provided with a release button 12, a power switch 13 and a mode dial 14. A lateral face of the digital still camera 2 is provided with a card slot lid 15. A memory card slot is covered by the card slot lid 15. A memory card 48 as external memory (see FIG. 6) is inserted in the memory card slot as will be described later.

A focus adjusting ring 16 as focus adjuster and an AF/MF mode selecting button 17 are disposed on the outside of the lens barrel 11. The focus adjusting ring 16 is rotatable about the lens barrel 11, and effective when a manual focusing (MF) mode is set, for manually adjusting a focus of the pickup lens 10. The mode selecting button 17 is slidable, and shifted for setting a selected one of an auto focusing (AF) mode and a manual focusing (MF) mode.

An electronic viewfinder (EVF) 18 is incorporated in the digital still camera 2. An eyepiece window 19 is included in EVF 18, and appears in the rear of the digital still camera 2. Also, a liquid crystal display (LCD) panel 20 as image display panel and an operation panel 21 are disposed in the rear. The LCD panel 20 displays a photographed image, a through image and patterns for various menus. The operation panel 21 includes a menu button, a cursor shift button 60 as external operable switch, a selector button 62 as pattern selector, and a confirming button. The menu button is operable for displaying the menu pattern on the LCD panel 20. The cursor shift button 60 is used for shifting a cursor indicia in the menu pattern. The confirming button is used for confirming a selected item or parameter.

In the digital still camera 2, there are a still picture mode, a motion picture mode, a reproducing mode, and a setup mode. The still picture mode is used for photographing an image in a still picture manner. The motion picture mode is used for photographing an image in a motion picture manner. The reproducing mode is used for displaying the photographed image on the LCD panel 20. The setup mode is used for setting various conditions and parameters. To set a selected one of those modes, the mode dial 14 is rotationally shifted.

A release button is depressible in two depths for halfway depression and full depression. While the AF mode is set, the release button 12 is depressed halfway after framing by viewing EVF 18 or the LCD panel 20. Then relevant elements are set by adjustment for standby. Specifically, an exposure amount is adjusted. Focusing of the pickup lens 10 is automatically adjusted. A pickup signal obtained after the adjusting operation is held in a manner of holding or data locking before the release button 12 becomes left free by leaving a finger. Then the release button 12 is depressed fully in a deeper manner. A pickup signal of one frame after the adjustment is converted to image data, and is written to the memory card 48.

When in the MF mode, the release button 12 is depressed halfway. A display panel surface 20a of the LCD panel 20 responsively displays a through image in combination with an area split pattern 30 of the pattern type A of FIG. 3. The area split pattern 30 includes 36 partial areas 31 arranged in a matrix form of 6×6 in an equally split manner.

In the digital still camera 2, a focus adjusting state is detected for each of the partial areas 31 as will be described in detail. When one or more of the partial areas 31 is detected in-focus, an in-focus area pointing frame 32 is caused to appear to surround the one or more of the partial areas 31 distinctly from the remainder. When the focus adjusting ring 16 shifts, a position pointed by the area pointing frame 32 moves from areas to others among the partial areas 31. Note that it is possible to use two states of bright and dim color in place of using the area pointing frame 32. One or more of the partial areas 31 detected in-focus may be displayed brightly without a change. The remaining one of the partial areas 31 can be displayed in a dim color or translucent color distinct from the in-focus area. Furthermore, it is possible to indicate the area split pattern 30 in EVF 18 in addition to indication in the LCD panel 20.

Figure 3:
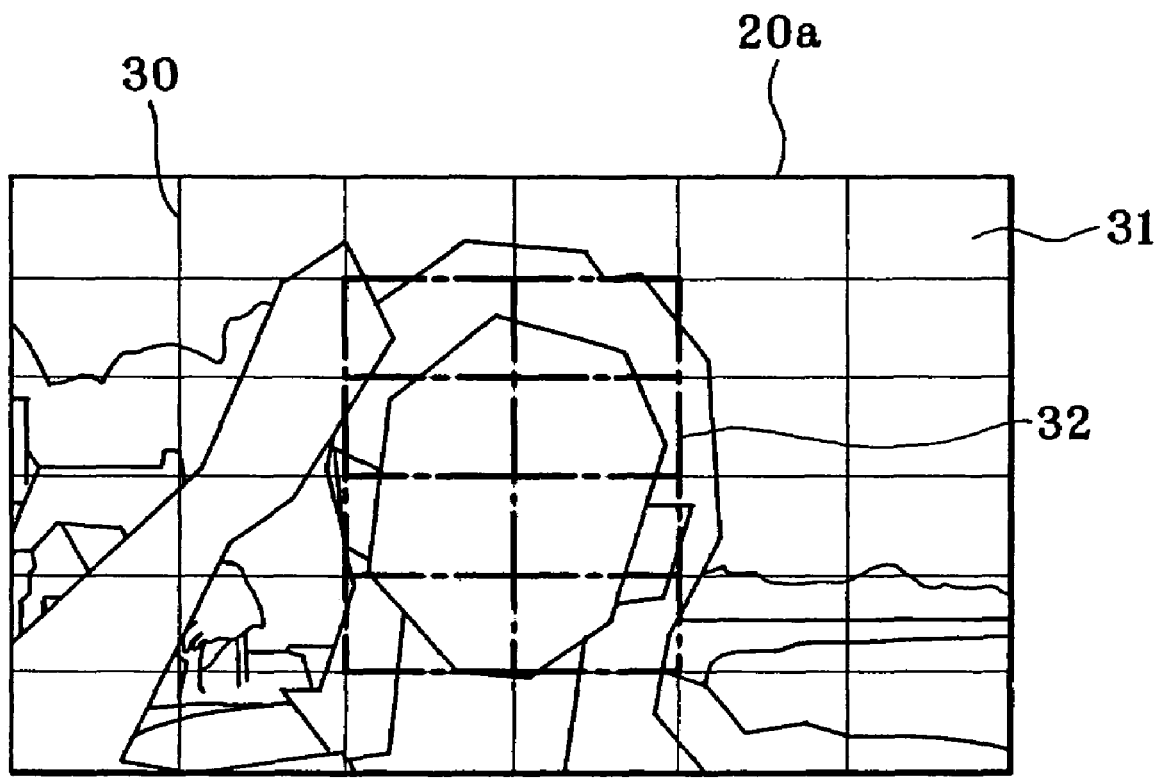
FIG. 3 is a plan illustrating an area split patten in a display panel.

Plural types of the area split pattern 30 are preset and stored, and include not only the pattern type A of FIG. 3 but pattern type B, C and D of FIG. 4. Those can be selectively used for a target scene to be picked up according to intention of a user. A pattern of the MF mode of FIG. 5 is stored, and used for the purpose of conditioning the turning on or off of displaying the area split pattern 30, and the type selection of the area split pattern 30. While the pattern of the MF mode is displayed, the selector button 62 in the operation panel 21 is operated to input signals for conditioning, and for selecting one of the patterns A, B, C and D. Note that it is possible to add a setting button or key different from the release button 12 for displaying the area split pattern 30. When the manual focus (MF) auxiliary setting or aid setting is turned on, the area split pattern 30 can appear irrespective of other states.

Figure 6:
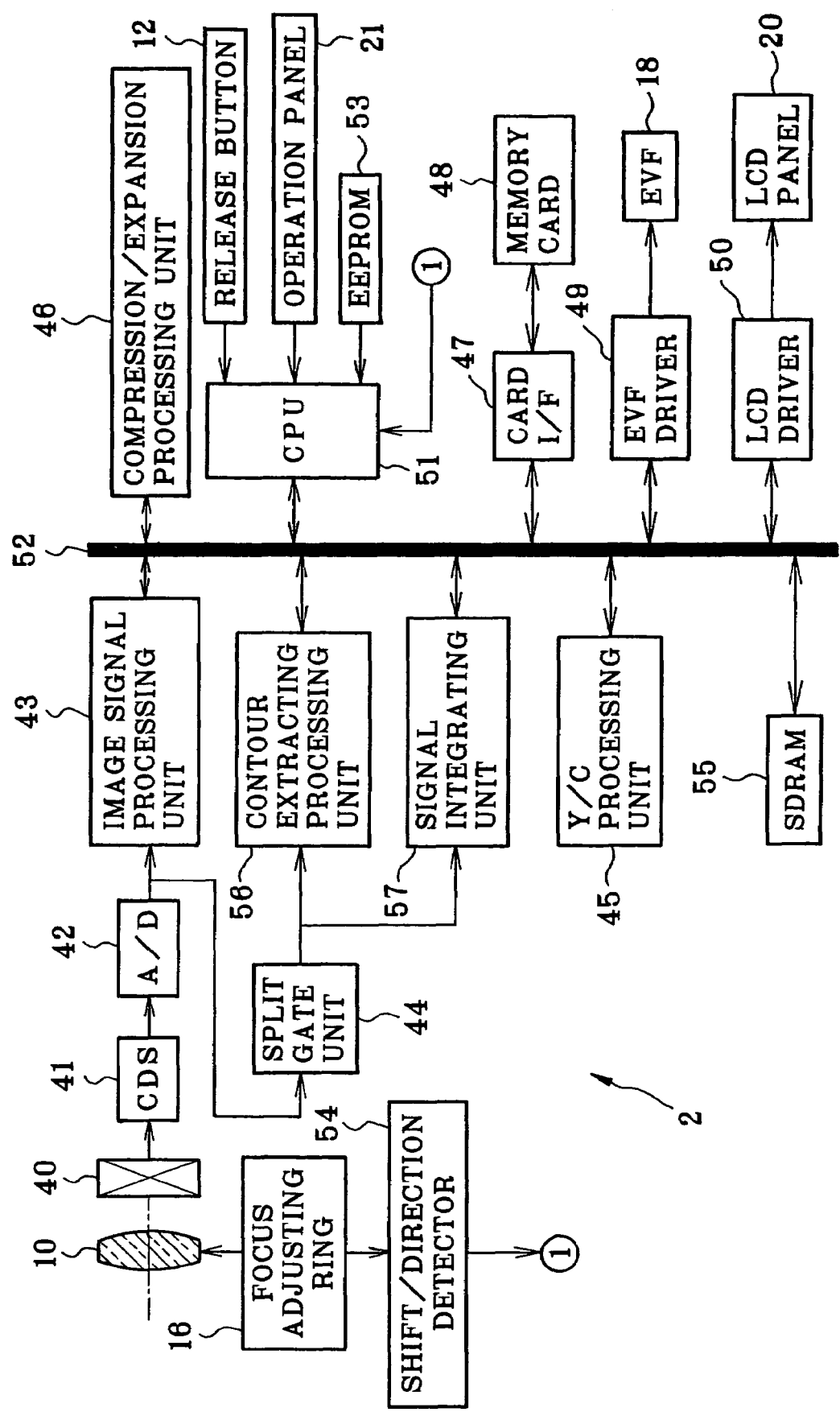
FIG. 6 is a block diagram schematically illustrating relevant circuitry of the digital still camera.

In FIG. 6, circuitry for the digital still camera 2 is illustrated. A CCD (charge coupled device) 40 or image area sensor is disposed behind the pickup lens 10, and converts object light from the pickup lens 10 into a pickup signal. A correlating double sampling circuit (CDS) 41 is supplied with the pickup signal from CCD 40, and outputs image data of Red, Green and Blue colors exactly in association with amounts of stored charge at each of cells of CCD 40. The image data from the correlating double sampling circuit 41 is amplified by an amplifier (not shown). An A/D converter 42 converts the image data to digital image data. The digital image data from the A/D converter 42 is sent to an image signal processing unit 43, and a split gate unit 44 as image data splitting unit.

The image signal processing unit 43 subjects the image data to various kinds of image processing, including gradation conversion, white balance correction, gamma-correction and the like. The image data after being processed in the image signal processing unit 43 is sent to a Y/C processing unit 45, which converts the image data to a brightness signal Y and color difference signals Cr and Cb. A compression/expansion processing unit 46 subjects the converted image data to image compression according to a predetermined compression format, for example JPEG format (Joint Photographic Experts Group) format.

The image data compressed by the compression/expansion processing unit 46 is transferred through a card interface (I/F) 47, and written to the memory card 48. Also, an electronic viewfinder (EVF) driver 49 is supplied with the image data to display an image in EVF 18. Furthermore, an LCD driver 50 converts the image data to a composite signal, to display the image on the LCD panel 20.

A system bus 52 connects various circuits and elements to a CPU 51 as controller, which controls relevant units included in the entirety of the digital still camera 2. Also, an EEPROM 53 as split pattern memory and a shift/direction detector 54 are connected to CPU 51 in addition to the release button 12 and the operation panel 21. EEPROM 53 stores programs for various controls, information of settings, and the like. Also, there is an SDRAM 55 as evaluation value memory including registers. CPU 51 reads information from EEPROM 53, and writes the same information to SDRAM 55 as work memory for operation.

The shift/direction detector 54 includes an encoder and a photo sensor, and detects a rotation or rotational shift of the focus adjusting ring 16 and a rotational direction of the shift of the same. A result of the detected direction of the shift is stored in SDRAM 55 in a temporary manner. At each time that the focus adjusting ring 16 rotates, SDRAM 55 renews and overwrites the data of the shift and direction.

The split gate unit 44 receives the image signal from the A/D converter 42, and splits the same into signals or area image data associated with respectively the partial areas 31 in the area split pattern 30. See the pattern type A. There are a contour extracting processing unit or contour signal integrating unit 56, and an image signal integrating unit 57 to which the area image data are sent for each of the partial areas 31, and which constitute a focus evaluator.

The contour signal integrating unit 56 subjects the area image signal to the contour extracting processing, and obtains an extracted contour signal, and integrates the extracted contour signal for one area. The image signal integrating unit 57 integrates an image signal for one area, an example of the image signal being a brightness signal. Note that the contour signal integrating unit 56 may be a band-pass filter or other suitable elements well-known in the art.

The contour signal and the area image signal after integration for each one area are transmitted to CPU 51 by the system bus 52. CPU 51 calculates a focus evaluation value fn for the focus adjusting state of the partial areas 31, according to the equation of $$fn = dn/vn$$

in which n is 1-36, dn is the contour signal of one area, and vn is the area image signal of one area.

CPU 51 starts calculating the focus evaluation value fn upon detecting shifts of the focus adjusting ring 16 in the shift/direction detector 54, to execute arithmetic operation of the above equation for those 36 areas. The focus evaluation value fn is written to registers Rn (not shown) in SDRAM 55. Note that highness of the focus evaluation value fn represents a state of a great amount of a high-frequency component of an image, and thus a well-focused state of the area. The focus evaluation value fn is a ratio of the contour signal dn to the image signal vn. This is for the purpose of preventing fluctuation in the focus evaluation value fn even upon an abrupt change in the brightness of the object image. It is possible to calculate the focus evaluation value fn according to average values of the contour signal dn and the image signal vn between a number of frames, in order to suppress influence of flickers of fluorescent light or other periodical changes in the brightness.

There are three groups of registers Rna, Rnb and Rnc. The registers Rna store the present focus evaluation value fna of focus evaluation value fn. The registers Rnb store the preceding evaluation value fnb of focus evaluation value fn. The registers Rnc store one prior preceding evaluation value fnc directly before the preceding evaluation value fnb of focus evaluation value fn. The number of all the registers is 108 as 36×3. For setting the present focus evaluation value fna in the registers Rna, the prior preceding evaluation value fnc is deleted from or reset from the registers Rnc. The preceding evaluation value fnb stored in the registers Rnb is shifted and set in the registers Rnc. The present focus evaluation value fna stored in the registers Rna is shifted and set in the registers Rnb.

The focus evaluation value fn in the registers Rn is initialized or reset when the release button 12 is depressed halfway in the MF mode. Also, the same is initialized or reset when a shift of the focus adjusting ring 16 is detected by the shift/direction detector 54 and if the shift is in a direction different from a preceding shift.

Figure 7:
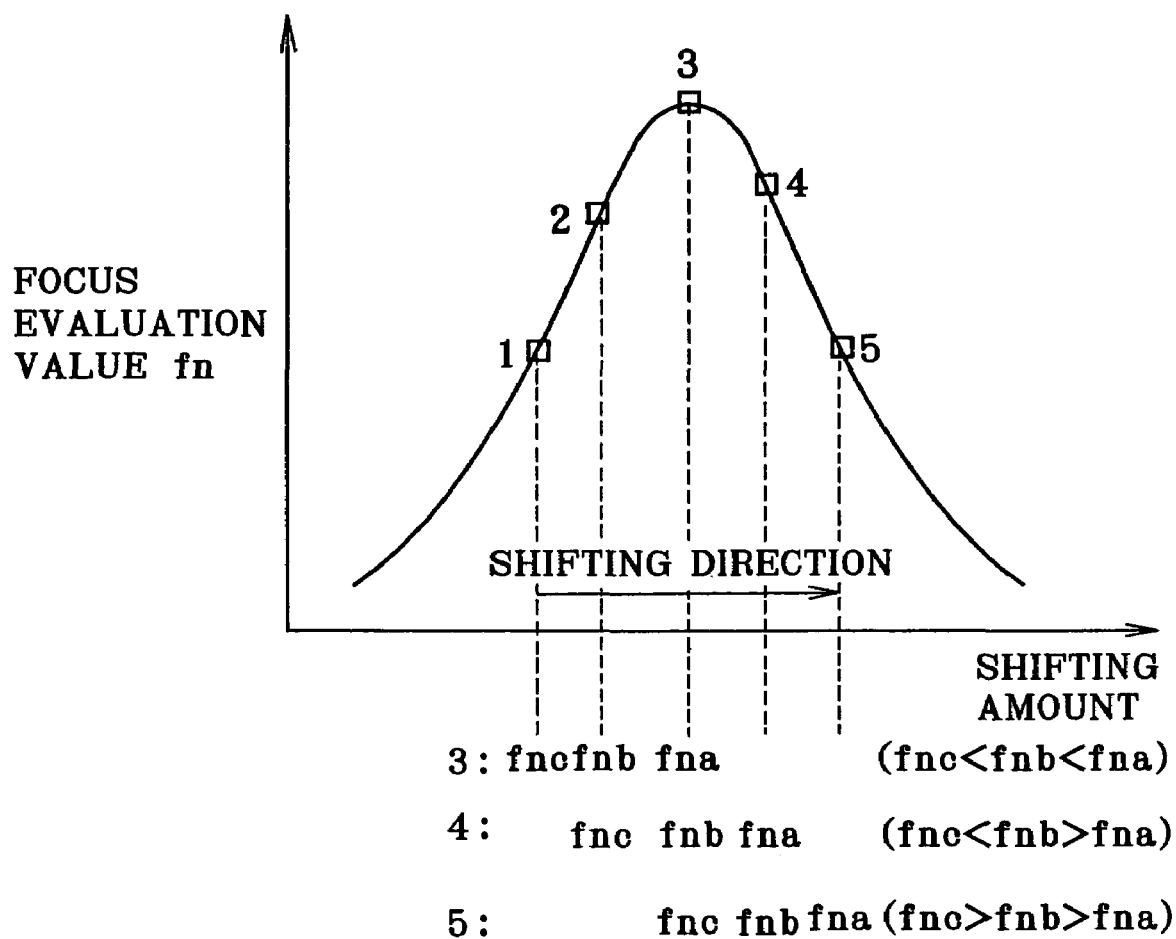
FIG. 7 is a graph illustrating a relationship of a focus evaluation value and a shifting distance.

CPU 51 reads the focus evaluation value fn from the registers Rn, compares the calculated value fn with the earlier values, and determines an in-focus or out-of-focus state of the partial areas 31. As illustrated in FIG. 7, each one area is judged as in-focus if the present focus evaluation value fna, the preceding evaluation value fnb and the prior preceding evaluation value fnc satisfy the condition of:

fnc<fnb>fna; and fna≧α;

fnb≧α;

fnc≧α.

Then CPU 51 causes the LCD driver 50 to indicate the area pointing frame 32 in the partial areas 31. CPU 51 operates for those processes until a half depression of the release button 12, or until full depression of the release button 12 for photographing. Note that a is a threshold value predetermined for preventing an error in detection in an unstable state, for example when a photographic scene is a low-contrast sene, or directly after initialization of the registers Rn.

Figure 8:
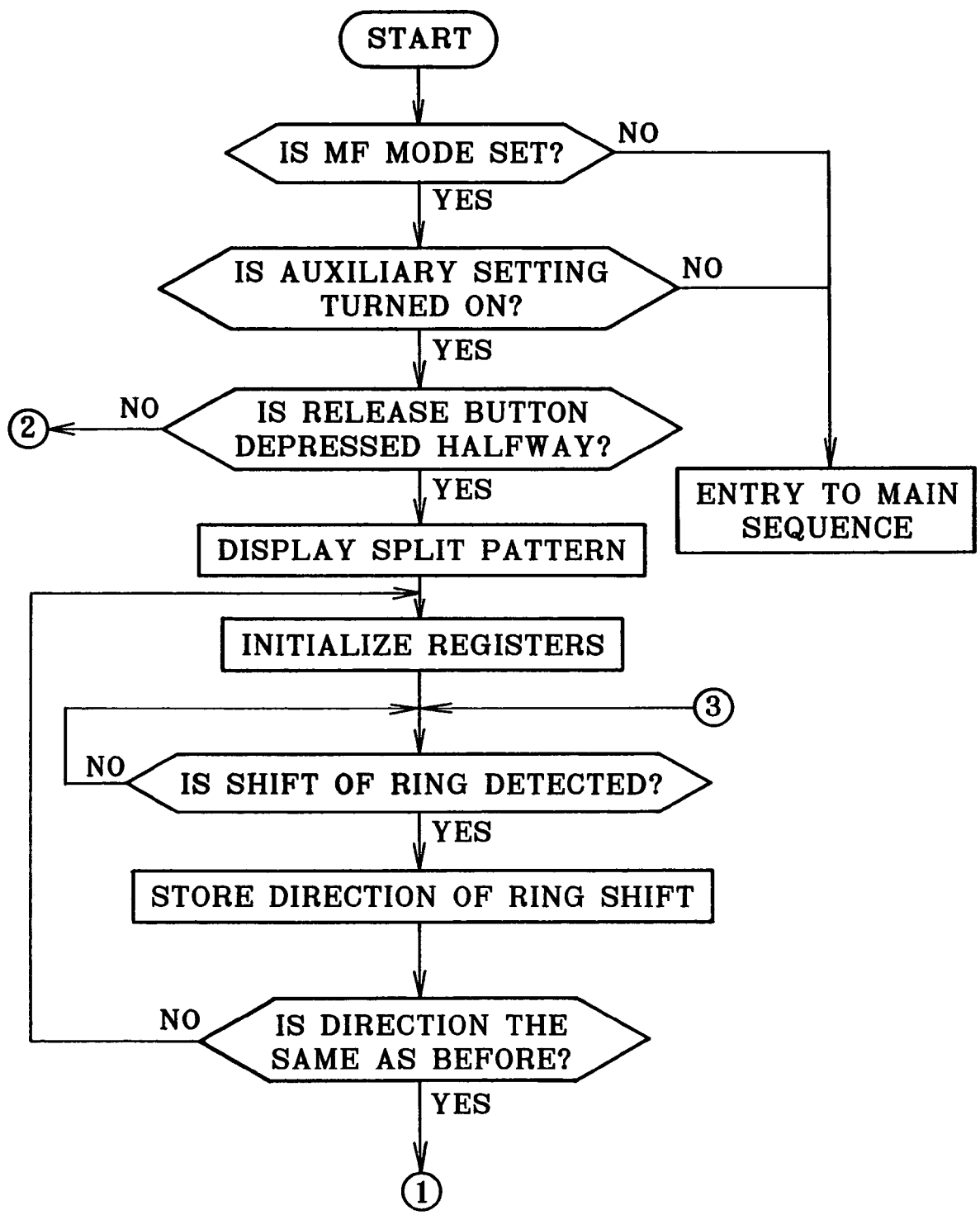
FIG. 8 is a flow chart illustrating a first half of detection of a focus adjusting state.
Figure 9:
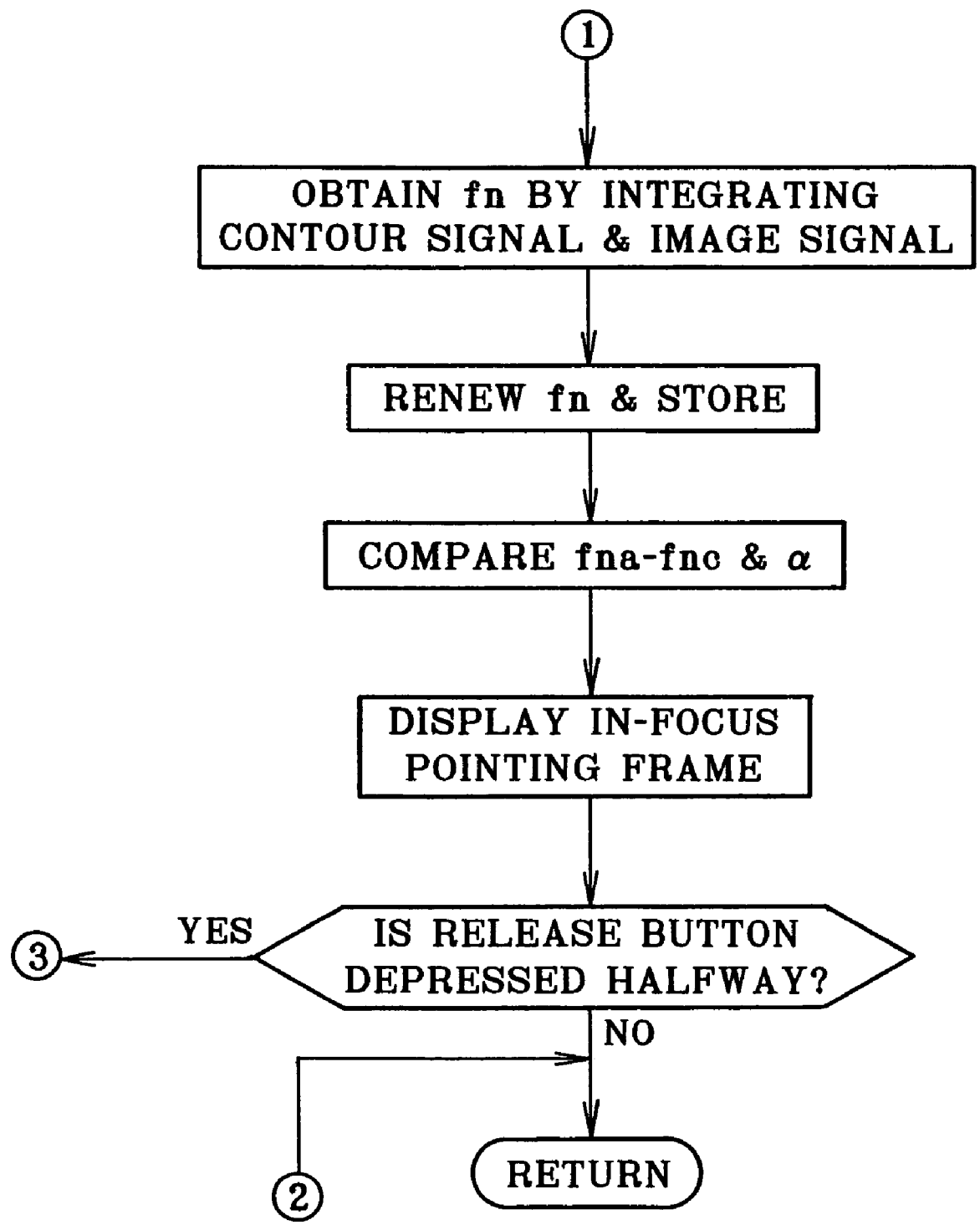
FIG. 9 is a flow chart illustrating a second half of the detection of FIG. 8.

The operation of the construction is now described with reference to FIGS. 8 and 9. At first, the power switch 13 is turned on. The mode dial 14 is rotationally operated to select a still picture mode. If the AF mode is set, then a main sequence or normal routine is started. Also, if the MF auxiliary setting or aid setting is turned off in the MF mode, then the main sequence is started.

If the MF auxiliary setting is kept turned on in the MF mode, the release button 12 is depressed halfway. The area split pattern 30 is displayed on the panel surface 20a of the LCD panel 20. Also, the registers Rn are initialized. This state is maintained before a shift of the focus adjusting ring 16 is detected by the shift/direction detector 54.

When the focus adjusting ring 16 is rotated, a direction of the rotational shift is recorded to SDRAM 55 in a temporary manner. If the direction of the focus adjusting ring 16 is different from that of a rotational shift prior to this, then the registers Rn are initialized, to return to an initial state. If the direction of the focus adjusting ring 16 is the same as that of a rotational shift prior to this, then the contour signal integrating unit 56 and the image signal integrating unit 57 integrate the contour signal and the image signal as circuits in the focus evaluator. CPU 51 calculates the focus evaluation value fn. The focus evaluation value fn is sent to the registers Rn, and renewed and stored in a sequential manner.

Data including the present focus evaluation value fna, the preceding evaluation value fnb and the prior preceding evaluation value fnc are read from registers Rn, and sent to CPU 51, which subjects those and the threshold value a to comparison. If the conditions fnc<fnb>fna;

fna≧α;

fnb≧α;

fnc≧α are satisfied by the results of the comparison, then it is determined that the associated area included in the partial areas 31 is in-focus. The area pointing frame 32 is indicated at the area of the partial areas 31. A sequence of those steps is repeatedly effected until discontinuation of halfway depression of the release button 12.

A user rotates the focus adjusting ring 16 with the release button 12 depressed halfway. When the area pointing frame 32 appears at one or more of the partial areas 31 where he or she intends, then the release button 12 is depressed fully, to pick up an object image. Accordingly, an intended object can be focused easily.

Figure 10:
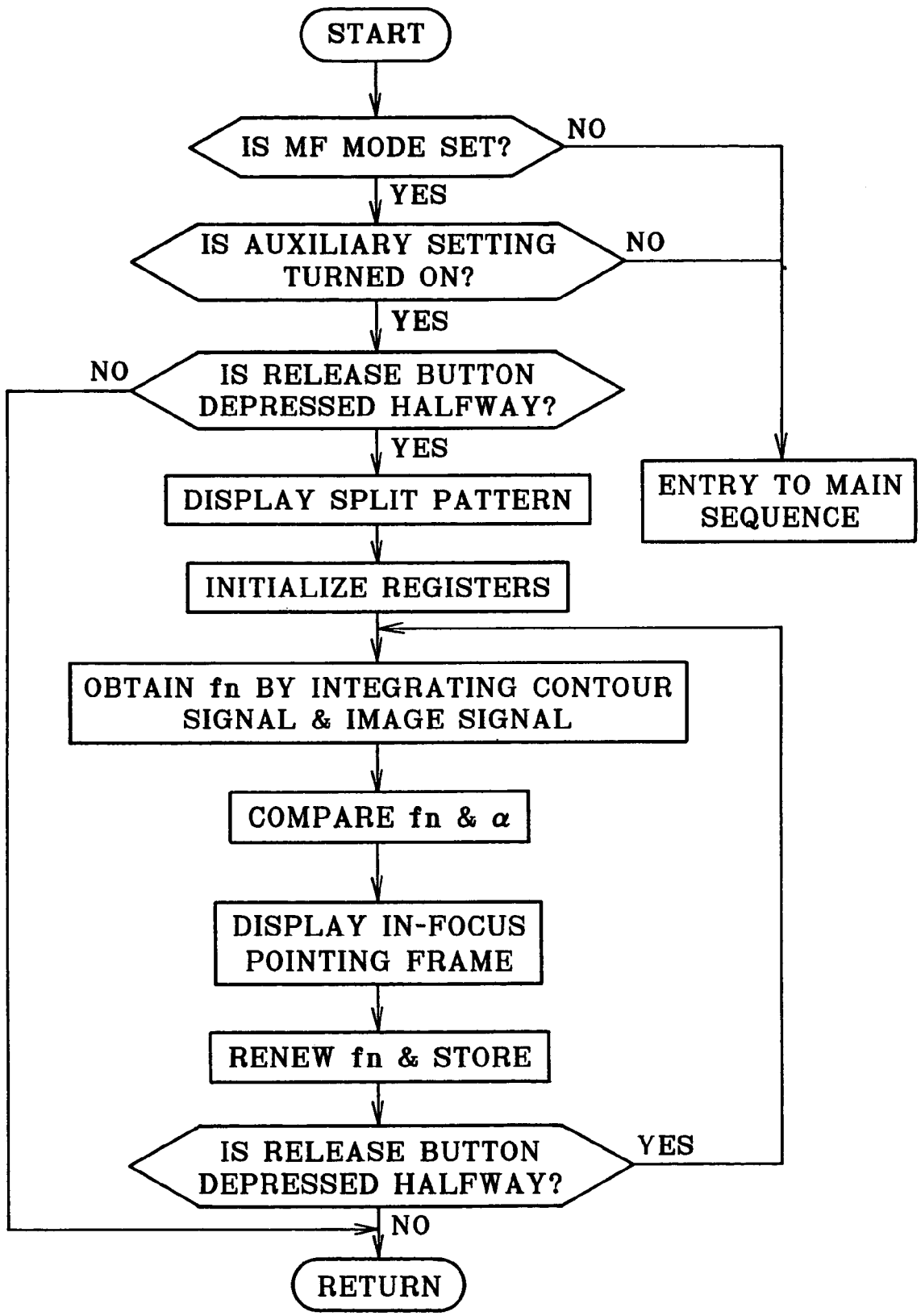
FIG. 10 is a flow chart illustrating another preferred process of detecting a focus adjusting state.
Figure 11:
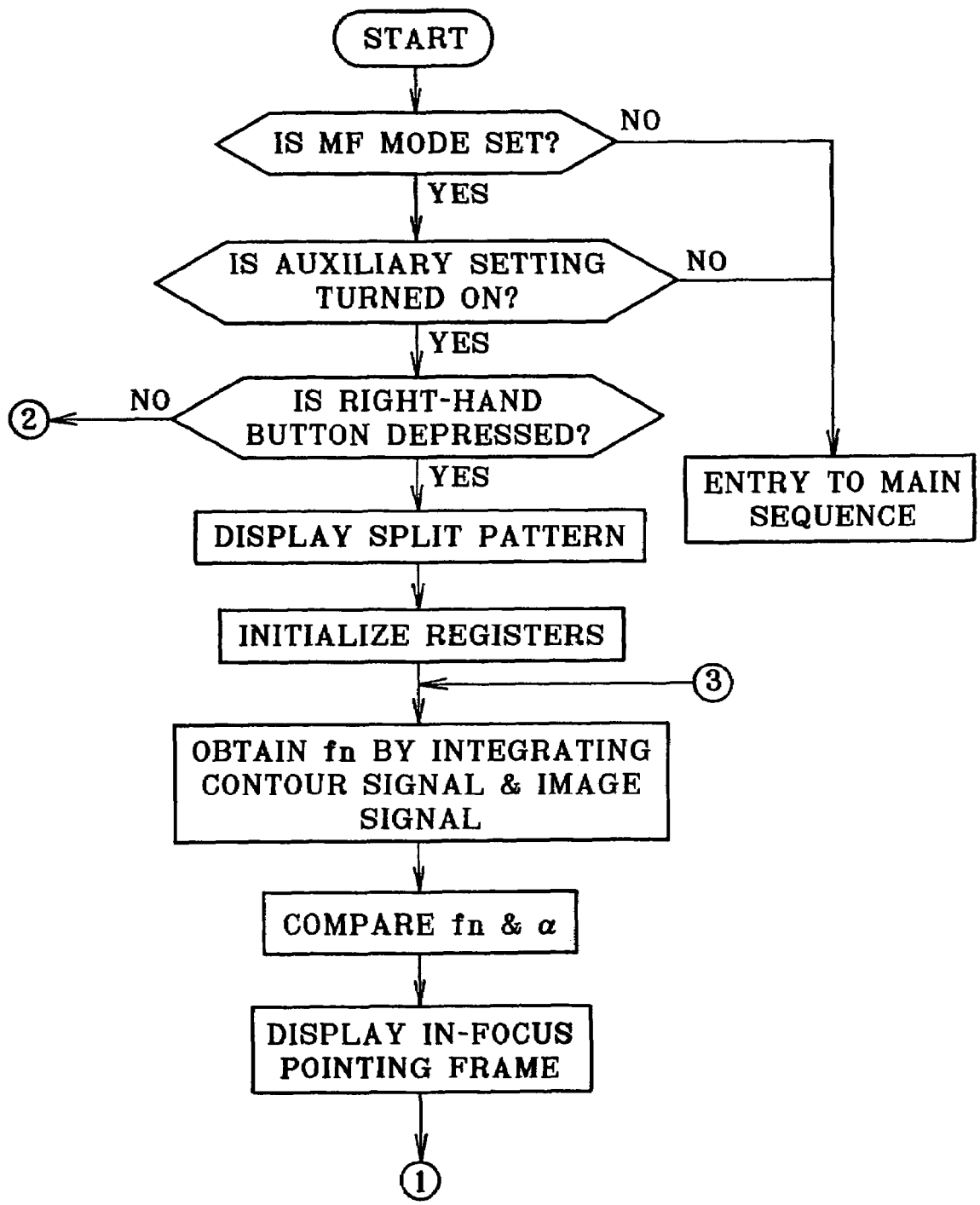
FIG. 11 is a flow chart illustrating a first half of still another preferred process of detection of a focus adjusting state.
Figure 12:
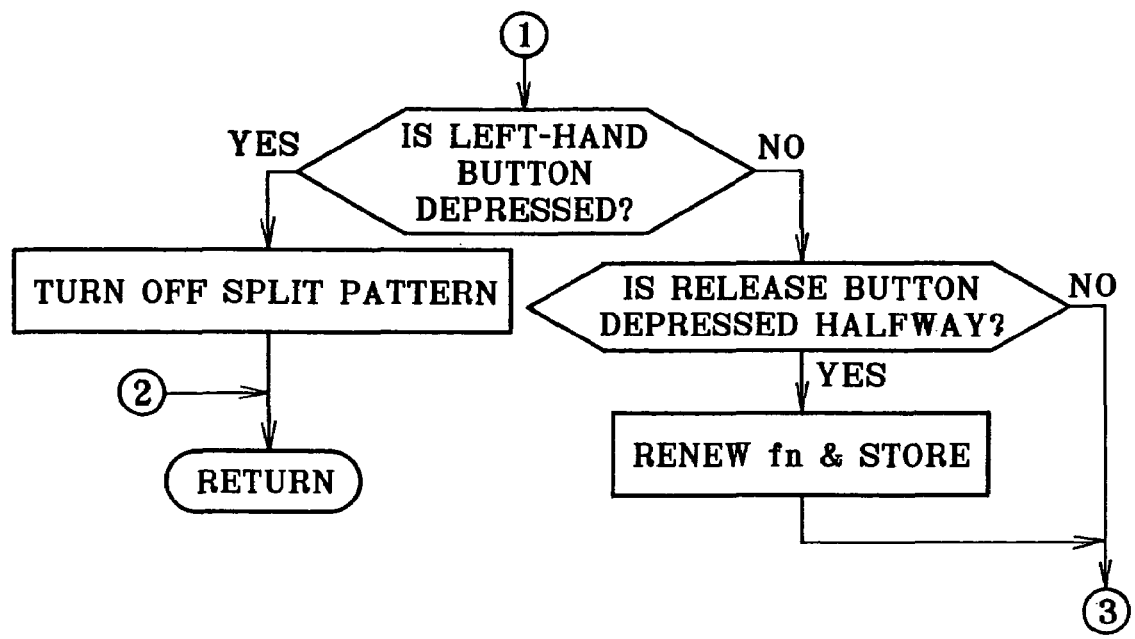
FIG. 12 is a flow chart illustrating a second half of the process of FIG. 11.

Note that if the shift/direction detector 54 does not exist, the processes depicted in FIG. 10 or FIGS. 11 and 12 can be used to obtain the above-described effects. Another preferred embodiment will be hereinafter described, in which the lack of the shift/direction detector 54 only constitutes a difference from the above embodiment. Elements similar to those of the above embodiment are designated with identical reference numerals.

In FIG. 10, the MF auxiliary setting or aid setting is turned on in the MF mode, at first the release button 12 is depressed halfway. The panel surface 20a of the LCD panel 20 indicates the area split pattern 30. The registers Rn are initialized. Note that the number of the registers Rn is 36 and equal to that of the partial areas 31.

After the registers Rn are initialized, the contour signal and the image signal are integrated by means of the contour signal integrating unit 56 and the image signal integrating unit 57. Then CPU 51 obtains the focus evaluation value fn. CPU 51 reads the preceding evaluation values from the registers Rn, and compares the focus evaluation value fn is with that preceding the present focus evaluation value fn, to check the shift of the focus adjusting ring 16 is directed toward the in-focus state. If the focus evaluation value fn is larger than the preceding evaluation value, and if fn≧α, then it is determined that the shift of the focus adjusting ring 16 is one toward the in-focus state. The area pointing frame 32 is indicated in an associated one or more of the partial areas 31.

After the area pointing frame 32 becomes indicated, the calculated focus evaluation value fn is transferred to the registers Rn, and automatically renewed and stored. A sequence of those processes is repeated until the half depression of the release button 12 discontinues.

A user depresses the release button 12 halfway, and rotationally shifts the focus adjusting ring 16 in a direction for causing the area pointing frame 32 appear in one or more of the partial areas 31 where he or she intends an in-focus state. When the appearance of the area pointing frame 32 is turned off at the end of the rotational shift in one direction, then the release button 12 is depressed fully, to pick up an object image. In an SLR (single lens reflex) type of a digital camera with a changeable lens, a shift or shifting direction of the focus adjusting ring 16 cannot be detected. However, the focusing is possible according to the invention even in an SLR (single lens reflex) type of a digital camera.

In FIGS. 11 and 12, another preferred embodiment is illustrated. In place of the halfway depressible structure of the release button 12, a right-hand button portion of the cursor shift button 60 in the operation panel 21 is used for turning on the indication of the area split pattern 30 on the panel surface 20a of the LCD panel 20. When a left-hand button portion of the cursor shift button 60 is depressed, the indication of the area split pattern 30 is turned off on the LCD panel 20. After the area pointing frame 32 becomes indicated, the registers Rn store the new set of the focus evaluation value fn by overwriting of the former focus evaluation value fn upon halfway depression of the release button 12. Note that the turning on and off of the area split pattern 30 may be changed over by use of a toggle switch as a single switch element unlike the cursor shift button 60 including plural elements. Also, a switching element for renewing and overwriting the focus evaluation value fn may be added in a separate manner from the release button 12.

In a state of FIGS. 11 and 12, if the MF auxiliary setting or aid setting is kept turned on in the MF mode, a right-hand button portion at the cursor shift button 60 is depressed. Then the panel surface 20a of the LCD panel 20 displays the area split pattern 30. The registers Rn are initialized.

Upon initialization of the registers Rn, the contour signal integrating unit 56 and the image signal integrating unit 57 integrate the contour signal and the image signal, so that CPU 51 obtains the focus evaluation value fn. CPU 51 reads the preceding evaluation value from the registers Rn, compares the focus evaluation value fn with the preceding evaluation value, and checks whether the focus adjusting ring 16 shifts in a direction toward the in-focus state. If the focus evaluation value fn is greater than the preceding evaluation value, and if $fn \geq \alpha$, then CPU 51 determines that the focus adjusting ring 16 shifts in the direction toward the in-focus state. The area pointing frame 32 is caused by CPU 51 to appear in a corresponding area among the partial areas 31.

After the area pointing frame 32 comes to appear, a left-hand button portion at the cursor shift button 60 is depressed. Then the area split pattern 30 is caused to disappear. When the release button 12 is depressed halfway without operation of the left-hand button portion at the cursor shift button 60, the earlier evaluation values having been stored in the registers Rn is set by renewal of the focus evaluation value fn. If the release button 12 is left to stand without half depression, there is no renewal of the focus evaluation value fn in the registers Rn. A sequence of those steps is repeatedly effected.

Figure 13:
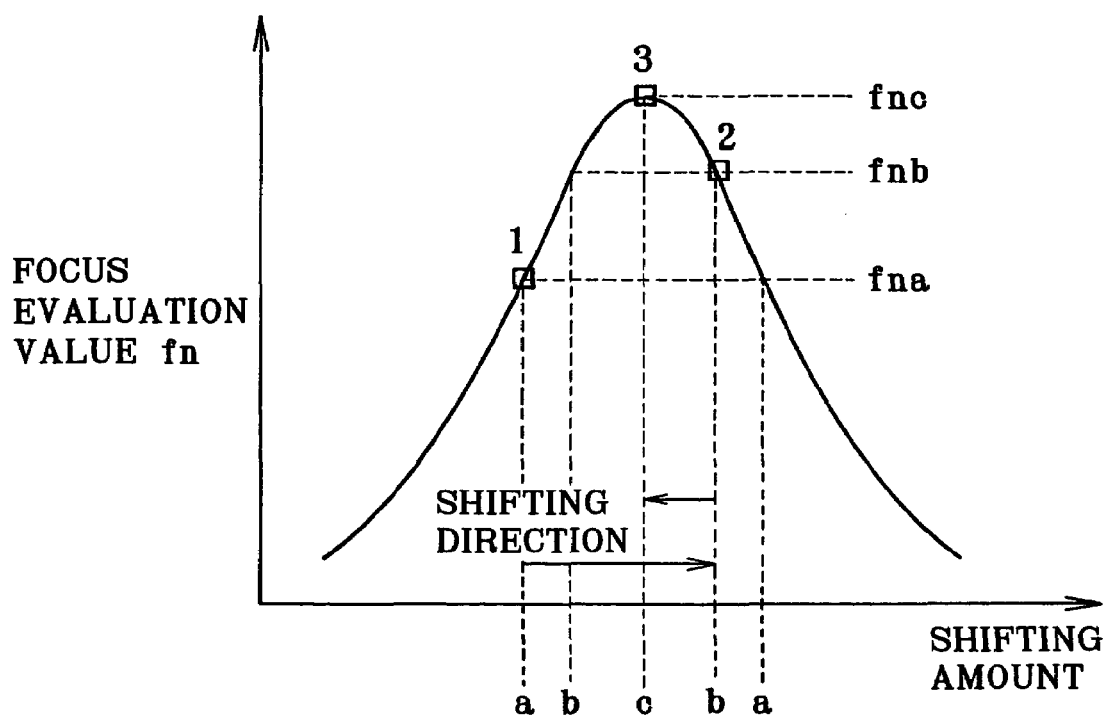
FIG. 13 is a graph illustrating a relationship of a focus evaluation value and a shifting distance according to the embodiment of FIGS. 11 and 12.

In FIG. 13, a user depresses the right-hand button portion of the cursor shift button 60, to indicate the area split pattern 30 on the LCD panel 20. He or she observes an intended one or more of the partial areas 31, and rotates the focus adjusting ring 16 in one direction for focusing the partial area. The release button 12 is depressed halfway, during which the focus evaluation value fna is obtained by calculation, and written to the registers Rn. This is Status 1. The area pointing frame 32 at this time is indicated in a range a-a in the drawing.

Then the focus adjusting ring 16 is rotated and set in an intermediate position which is in the range indicated by the area pointing frame 32. Again, the release button 12 is depressed halfway. The focus evaluation value fn is calculated newly, and set by renewal in place of the focus evaluation value fna, and stored in the registers Rn. This is referred to as Status 2. Similarly, the focus adjusting ring 16 is rotated, to set Status 3. New information of the focus evaluation value fn is written to the registers Rn. In Status 3, the focus adjusting ring 16 is rotated to indicate the area pointing frame 32 at one of the partial areas 31 desired by a user for an in-focus state. As a result, the in-focus state can be recognized exactly without limiting the direction of the rotational shift of the focus adjusting ring 16.

Note that the sign fnb in FIG. 13 is used for the focus evaluation value in Status 2. The sign fnc is used for the focus evaluation value in Status 3.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A pickup device comprising:
a pickup lens for focusing an image of an object on a focal plane;
an externally operable manual focus adjuster, externally operated in a mode of manual focusing, for focusing said pickup lens;
an image sensor, disposed on said focal plane, for generating an image signal by photoelectric conversion of said object image;
an image display panel for displaying an image according to said image signal;
a focus evaluator for evaluating a focus adjusting state of respectively plural partial areas determined by splitting said image display panel; and
a display controller for indicating respectively said areas, and for displaying said focus adjusting state of respectively said areas,
wherein said focus evaluator includes:
a focus evaluation value determiner for determining a focus evaluation value of respectively said areas according to said image signal;
an evaluation value memory for storing a preceding focus evaluation value of respectively said areas determined previously; and
a controller for comparing said focus evaluation value with said preceding evaluation value read from said evaluation value memory, and for evaluating said focus adjusting state for respectively said areas.

2. A pickup device as defined in claim 1, wherein the preceding focus evaluation value of respectively said areas was obtained from the focus evaluation determiner immediately prior to the focus evaluation value which is compared with said preceding evaluation value.

3. A pickup device comprising:
a pickup lens for focusing an image of an object on a focal plane;
an externally operable manual focus adjuster, externally operated in a mode of manual focusing, for focusing said pickup lens;
an image sensor, disposed on said focal plane, for generating an image signal by photoelectric conversion of said object image;
an image display panel for displaying an image according to said image signal;
a focus evaluator for evaluating a focus adjusting state of respectively plural partial areas determined by splitting said image display panel; and
a display controller for indicating respectively said areas, and for displaying said focus adjusting state of respectively said areas,
wherein said focus evaluator includes:
an image data splitting unit for splitting said image signal between said areas;
a contour signal integrating unit for subjecting said image signal to contour extracting processing for respectively said areas to obtain a contour signal, and for integrating said contour signal to obtain a first integration signal for respectively said areas;
an image signal integrating unit for integrating said image signal according to splitting between said areas, to obtain a second integration signal for respectively said areas;

a determining unit for determining said focus evaluation value according to said first and second integration signals.

4. A pickup device comprising:
a pickup lens for focusing an image of an object on a focal plane;
an externally operable manual focus adjuster, externally operated in a mode of manual focusing, for focusing said pickup lens;
an image sensor, disposed on said focal plane, for generating an image signal by photoelectric conversion of said object image;
an image display panel for displaying an image according to said image signal;
a focus evaluator for evaluating a focus adjusting state of respectively plural partial areas determined by splitting said image display panel; and
a display controller for indicating respectively said areas, and for displaying said focus adjusting state of respectively said areas,
wherein said focus evaluator includes:
a focus evaluation value determiner for determining a focus evaluation value of respectively said areas according to said image signal;
an evaluation value memory for storing a preceding focus evaluation value of respectively said areas determined previously; and
a controller for comparing said focus evaluation value with said preceding evaluation value read from said evaluation value memory, and for evaluating said focus adjusting state for respectively said areas,
wherein said focus evaluation value determiner includes:
an image data splitting unit for splitting said image signal between said areas;
a contour signal integrating unit for subjecting said image signal to contour extracting processing for respectively said areas to obtain a contour signal, and for integrating said contour signal to obtain a first integration signal for respectively said areas;
an image signal integrating unit for integrating said image signal according to splitting between said areas, to obtain a second integration signal for respectively said areas; and
a determining unit for determining said focus evaluation value according to said first and second integration signals.

5. A pickup device as defined in claim 4, wherein said display controller causes said image display panel to display a line pattern for splitting said image into said areas, and to render any in-focus areas distinct from those areas that are out-of-focus.

6. A pickup device as defined in claim 5, wherein said in-focus area is differently displayed from said out-of-focus areas in a form of said line pattern or brightness.

7. A pickup device as defined in claim 5, wherein said controller compares said focus evaluation value fna with said preceding evaluation value fnb read from said evaluation value memory, and if fna>fnb and if said focus evaluation value fna is equal to or more than a threshold value, then determines that said focus adjusting state is becoming an in-focus state.

8. A pickup device as defined in claim 7, further comprising an externally operable unit for inputting a signal, and for writing said focus evaluation value fna at an address of said preceding evaluation value fnb by overwriting.

9. A pickup device as defined in claim 5, further comprising a shift/direction detector for detecting a shifting direction and a shifting amount of said manual focus adjuster, wherein said evaluation value memory is cleared upon a change of said shifting direction of said manual focus adjuster, and said focus evaluator checks said focus adjusting state of respectively said areas upon shifting of said manual focus adjuster by a predetermined shifting amount.

10. A pickup device as defined in claim 9, wherein said evaluation value memory stores at least said preceding evaluation value fnb, and a prior preceding evaluation value fnc prior to said preceding evaluation value fnb for respectively said areas;
upon determining said focus evaluation value fna, if fnc<fnb>fna and if fna, fnb and fnc are simultaneously equal to or more than a threshold value, then said controller determines that said focus adjusting state has become an in-focus state.

11. A pickup device as defined in claim 5, further comprising a mode switch for turning on a manual focus aid setting for an auxiliary use, wherein when said aid setting is turned on, said areas are kept displayed on said image display panel while said externally operable unit is operated.

12. A pickup device as defined in claim 11, wherein said externally operable unit comprises a release button, and said areas are displayed on said image display panel while said release button is halfway depressed.

13. A pickup device as defined in claim 11, wherein said externally operable unit is adapted to cursor shifting.

14. A pickup device as defined in claim 11, further comprising a split pattern memory for storing plural area split patterns between which at least one of a number, a size and an arrangement of said plural areas is different, said image display panel being controlled to display said plural areas according to a selected one of said area split patterns.

15. A pickup device as defined in claim 14, wherein one pattern among said area split patterns includes said areas arranged in a matrix form.

16. A pickup device as defined in claim 15, wherein a second pattern among said area split patterns includes a middle region and a peripheral region disposed thereabout.

* * * * *